United States Patent
Barnett et al.

(10) Patent No.: US 6,923,468 B1
(45) Date of Patent: Aug. 2, 2005

(54) ADJUSTABLE CONTAINER CARRIAGE

(76) Inventors: Cliff Barnett, 6745 Burning Tree Dr., Seminole, FL (US) 33777; David R. Barlow, 7620 Harborview Way N., Seminole, FL (US) 33776

( * ) Notice: Subject to any disclaimer, the term of this patent is extended or adjusted under 35 U.S.C. 154(b) by 75 days.

(21) Appl. No.: 10/816,111

(22) Filed: Apr. 1, 2004

(51) Int. Cl.$^7$ ............................................. B62B 3/02
(52) U.S. Cl. ........................ 280/651; 280/35; 280/47.34
(58) Field of Search ............................ 280/651, 47.34, 280/35, 47.35, 47.315, 47.26, 656, 79.3, 79.7, 79.11, 33.997, 47.11, 47.19, 39, 47.24, 638, 47.371, 144, 147, 38, 42, 641; 190/18 A, 39, 115

(56) References Cited

U.S. PATENT DOCUMENTS

| | | | |
|---|---|---|---|
| 175,259 A | | 3/1876 | Selman et al. |
| 1,300,533 A | * | 4/1919 | Wessinger .................. 248/129 |
| 2,001,894 A | | 5/1935 | Smith |
| 2,112,155 A | | 3/1938 | Haney et al. |
| 2,534,367 A | * | 12/1950 | Perrotta et al. ............... 280/35 |
| 3,841,650 A | | 10/1974 | Miskelly |
| 3,856,322 A | | 12/1974 | Bestehorn |
| 3,874,531 A | * | 4/1975 | Mayo .......................... 414/680 |
| 3,964,762 A | * | 6/1976 | Adams ........................ 280/639 |
| 4,166,638 A | * | 9/1979 | De Prado .................... 280/638 |
| 4,313,612 A | | 2/1982 | Rubens |
| 4,545,592 A | * | 10/1985 | Taskovic ...................... 280/35 |
| 5,018,930 A | * | 5/1991 | Hardin et al. ............... 414/458 |
| 5,249,823 A | * | 10/1993 | McCoy et al. .............. 280/656 |
| 5,299,817 A | * | 4/1994 | Chang .......................... 280/35 |
| D349,994 S | * | 8/1994 | Schurr .......................... D34/23 |
| 5,465,996 A | * | 11/1995 | Wisz ........................... 280/651 |
| 5,599,031 A | * | 2/1997 | Hodges .................... 280/79.11 |
| 5,826,670 A | * | 10/1998 | Nan ............................. 180/15 |
| 5,826,893 A | * | 10/1998 | Snoeyenbos ................. 280/43 |
| 6,203,031 B1 | * | 3/2001 | Leverington ................ 280/35 |
| 6,382,643 B1 | * | 5/2002 | Baker ....................... 280/79.11 |
| 6,783,147 B1 | * | 8/2004 | Green, Sr. .................. 280/652 |
| 6,786,503 B1 | * | 9/2004 | Young ......................... 280/656 |

FOREIGN PATENT DOCUMENTS

| | | | | |
|---|---|---|---|---|
| GB | WO 93/12964 | * | 7/1993 | ............. B62B/3/10 |

* cited by examiner

Primary Examiner—J. Allen Shriver
(74) Attorney, Agent, or Firm—Larson & Larson, PA; Herbert W. Larson (57) ABSTRACT

A front and rear wheel assembly having an axle housing with a wheel rotatable on a shaft at each end of the axle housing and a connecting member connecting a central portion of each axle housing. A right and left side upright support frame affixed to a top surface of each axle housing between the connecting member and the wheel. The upright support frames each have multiple engagement ridges on a top surface and side edges adjacent the top surface. A movable planar platform is slidably mounted with its C-channels enclosing the side edges of the support frame. A latch portion of the movable planar platform having a downwardly directed spike engaging the engagement ridges on the support frame. Lifting of the latch allows movement in or out of the planar platforms with respect to the connecting member to accommodate containers of different widths resting on the planar platforms.

16 Claims, 8 Drawing Sheets

ADJUSTABLE CONTAINER CARRIAGE

BACKGROUND OF THE INVENTION

This invention relates to a mobile container carriage. More specifically, it refers to a four wheeled mobile carriage for supporting containers of various dimensions.

Container carriages or dollies are common devices for assisting in moving large, heavy loads as seen by descriptions in many prior art references. In addition, U.S. Pat. No. 4,166,638 and 4,545,592 describe carriages that are adjustable in length and width to accommodate loads of different dimensions. Such adjustable carriages are more versatile and more desirable. However, the prior art adjustable devices are cumbersome and time consuming to adjust, particularly for different widths as shown in U.S. Pat. No. 4,545,592.

An adjustable carriage is needed which can be easily narrowed or widened to accommodate different containers.

SUMMARY OF THE INVENTION

The present invention solves the prior art problem by providing an adjustable carriage that can be either narrowed or widened by the flick of a latch and can be disassembled for storage. The invention is a carriage having a fixed front and rear wheel assembly connected by a central connecting member. Each wheel assembly has an axle housing with a rotating wheel at each end. An upright support frame rests on the top of each end portion of the axle housings between the central connecting member and the wheel. The support frames have engagement ridges on a top surface and side edges for engagement with a slidable planar platform. A complimentary spike on a bottom surface of the planar platform engages the ridges to lock the platform in position until a latch at an inboard end of the planar platform is lifted to disengage the spike and allow the platform to move to or away from the central connecting member and thereby narrow or widen the carriage.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE BEST MODE

Throughout the following description, the same reference numerals refer to the same elements in all figures.

Figure 1:
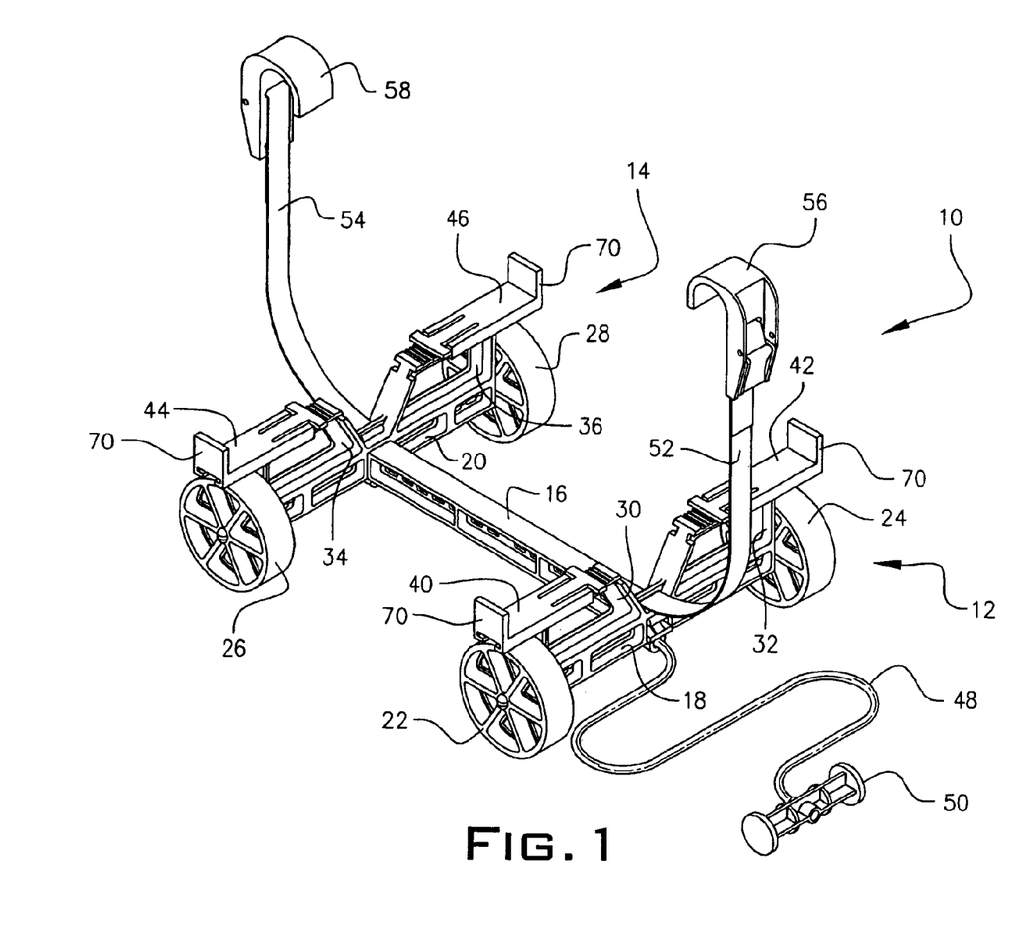
FIG. 1 is a perspective view of the adjustable container carriage of this invention, with snap on tie down clamps at the end of straps.

Referring to FIG. 1, the adjustable container carriage 10 has a front wheel assembly 12 and a rear wheel assembly 14 connected together by a central connecting member 16. The connecting member 16 has a snap in engagement to a front axle housing 18 at its front end through opening 86 and to a rear axle housing 20 at its rear end at a like opening. Each axle housing has a movable wheel at each end. Axle housing 18 has a metal shaft 66 at each end on which wheels 22 and 24 turn. Likewise, axle housing 20 has metal shafts 66 at each end on which wheels 26 and 28 turn. The front axle housing 18 is integral with a top surface of a right 30 and left 32 upright support frame and the rear axle housing 20 likewise is integral with a top surface of a right 34 and left 36 upright support frame.

Figure 2:
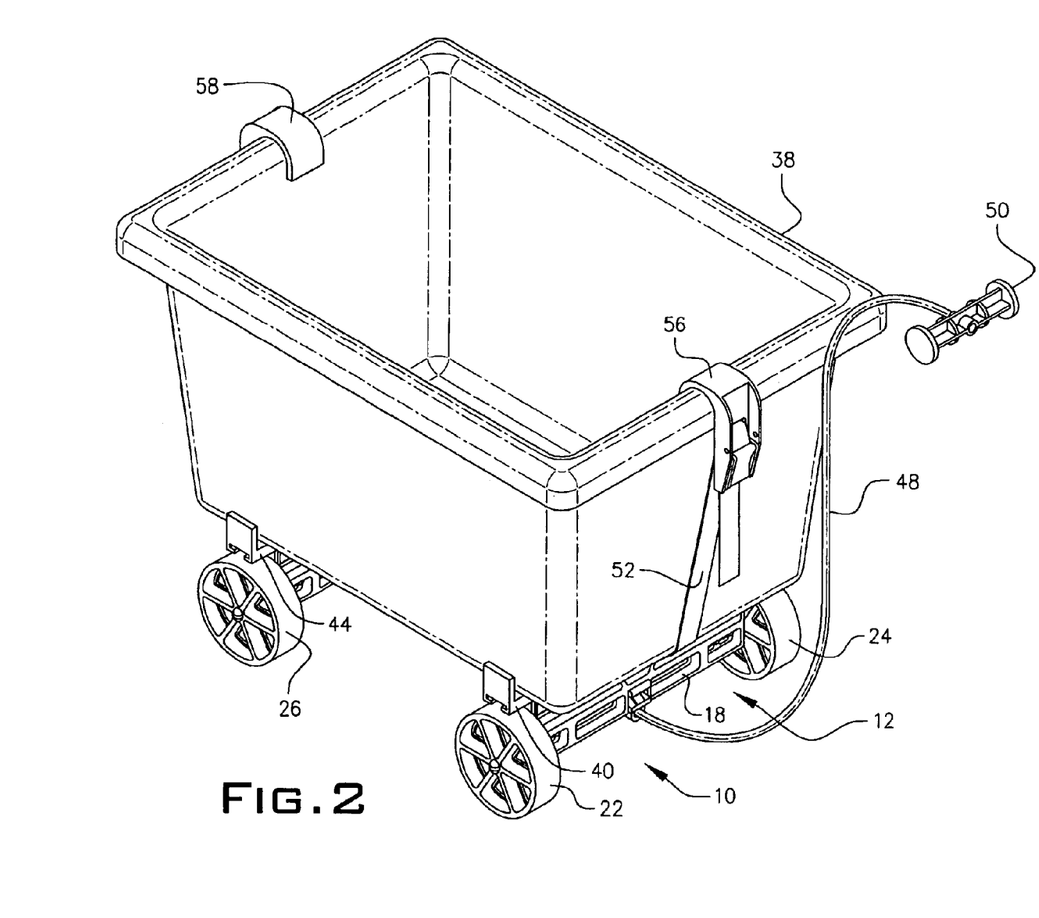
FIG. 2 is a perspective view of the carriage of FIG. 1 supporting an open container.

Referring to FIG. 2, the adjustable container carriage 10 has an open container 38 resting on four movable planar platforms 40, 42, 44 and 46. A pliable rope 48 with a handle 50 is used to pull the carriage and container. The rope 48 bottom end is engaged through opening 84 in axle housing 18. Alternatively, the rope 48 could be substituted with a rod or other similar device for pushing or pulling the carriage 10. Straps 52 and 54 are connected at a bottom slot 82 to axle housing 18 and 20, respectively. A top of each strap 52 and 54 has a clamp 56 and 58, respectively for holding the container 38 in place when the straps 52 and 54 are tightened.

Figure 3:
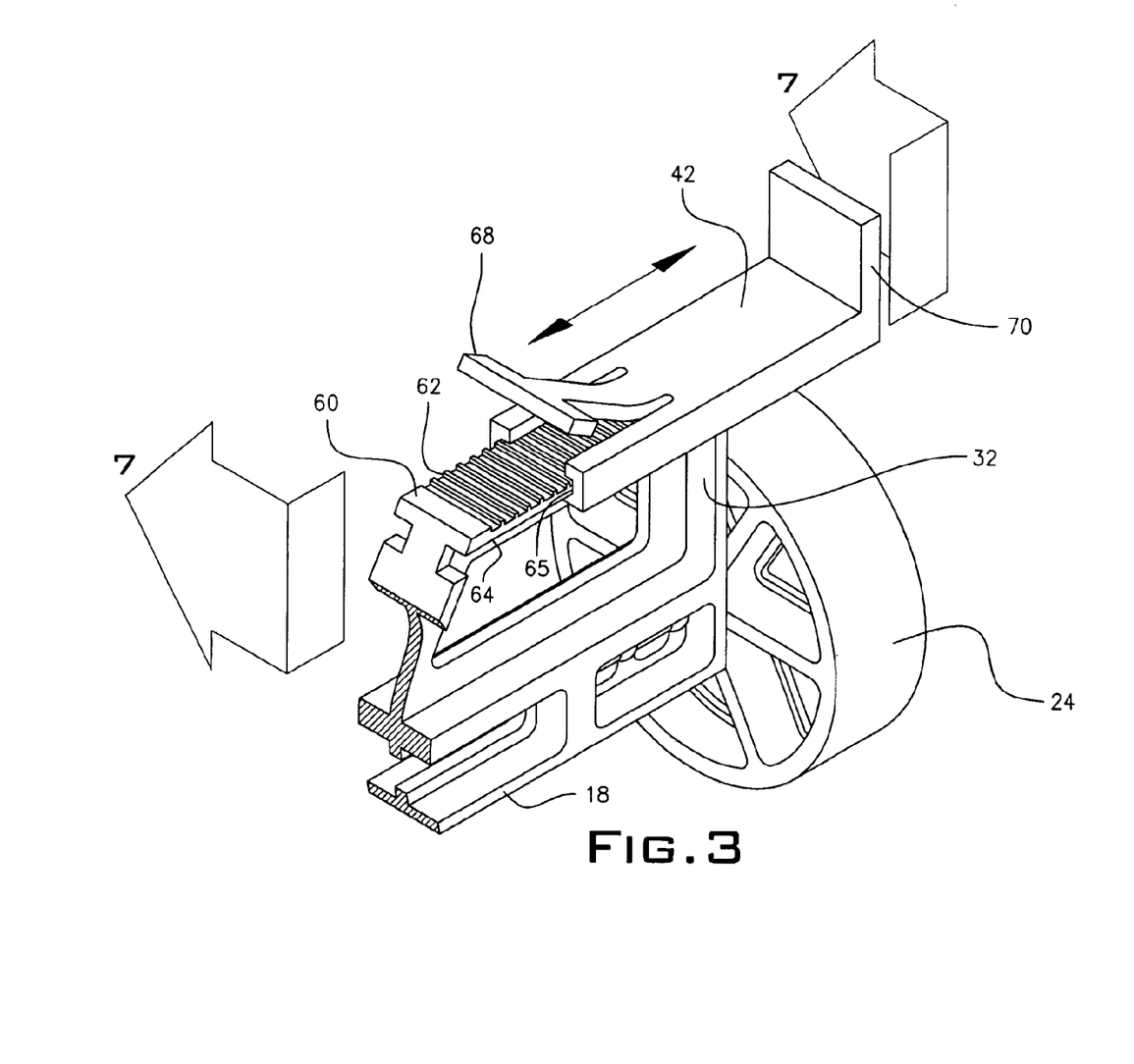
FIG. 3 is a broken partially sectional view of the axle housing, upright support frame and movable container platform.
Figure 7:
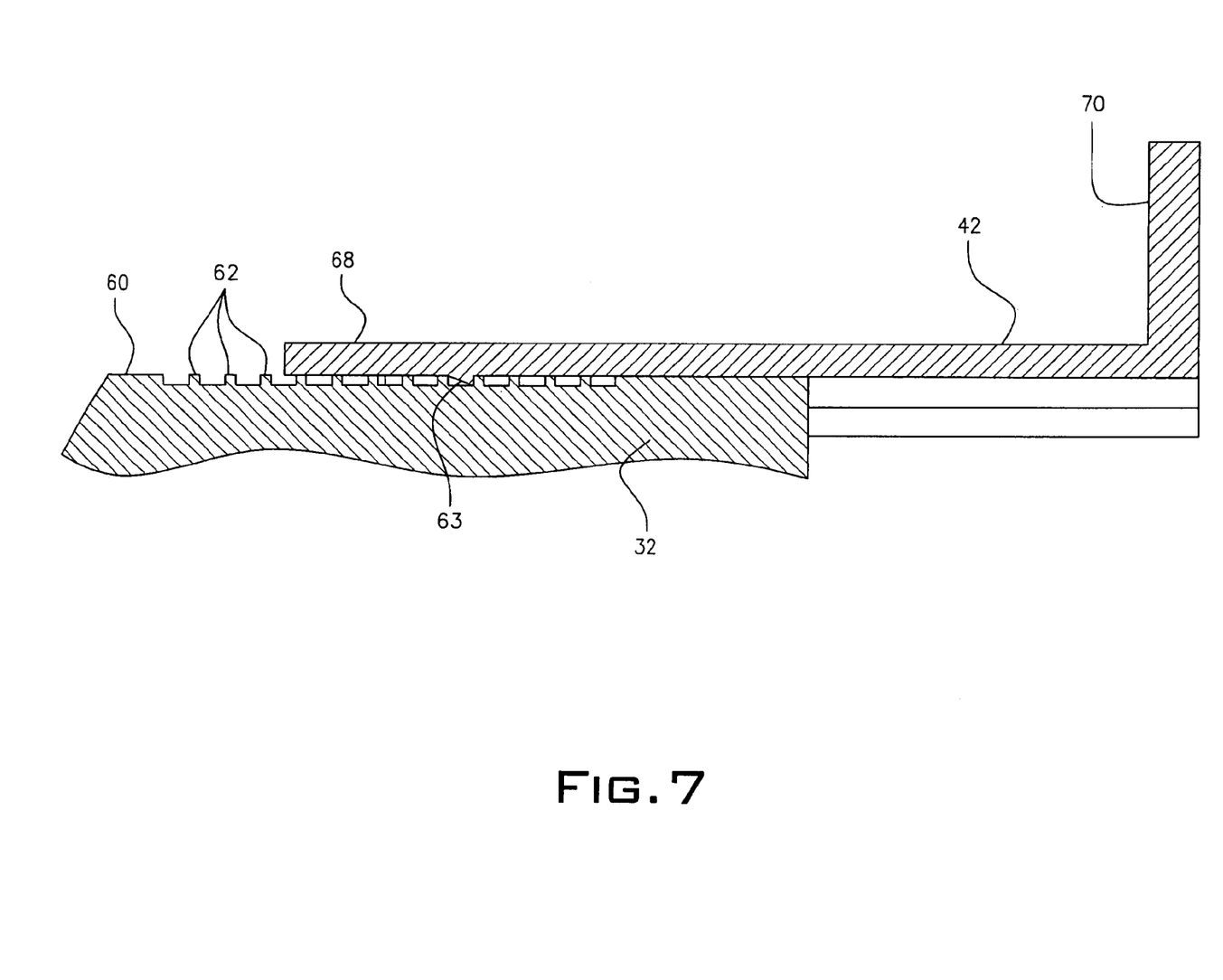
FIG. 7 is a cross sectional view along line 7—7 of FIG. 3.
Figure 8:
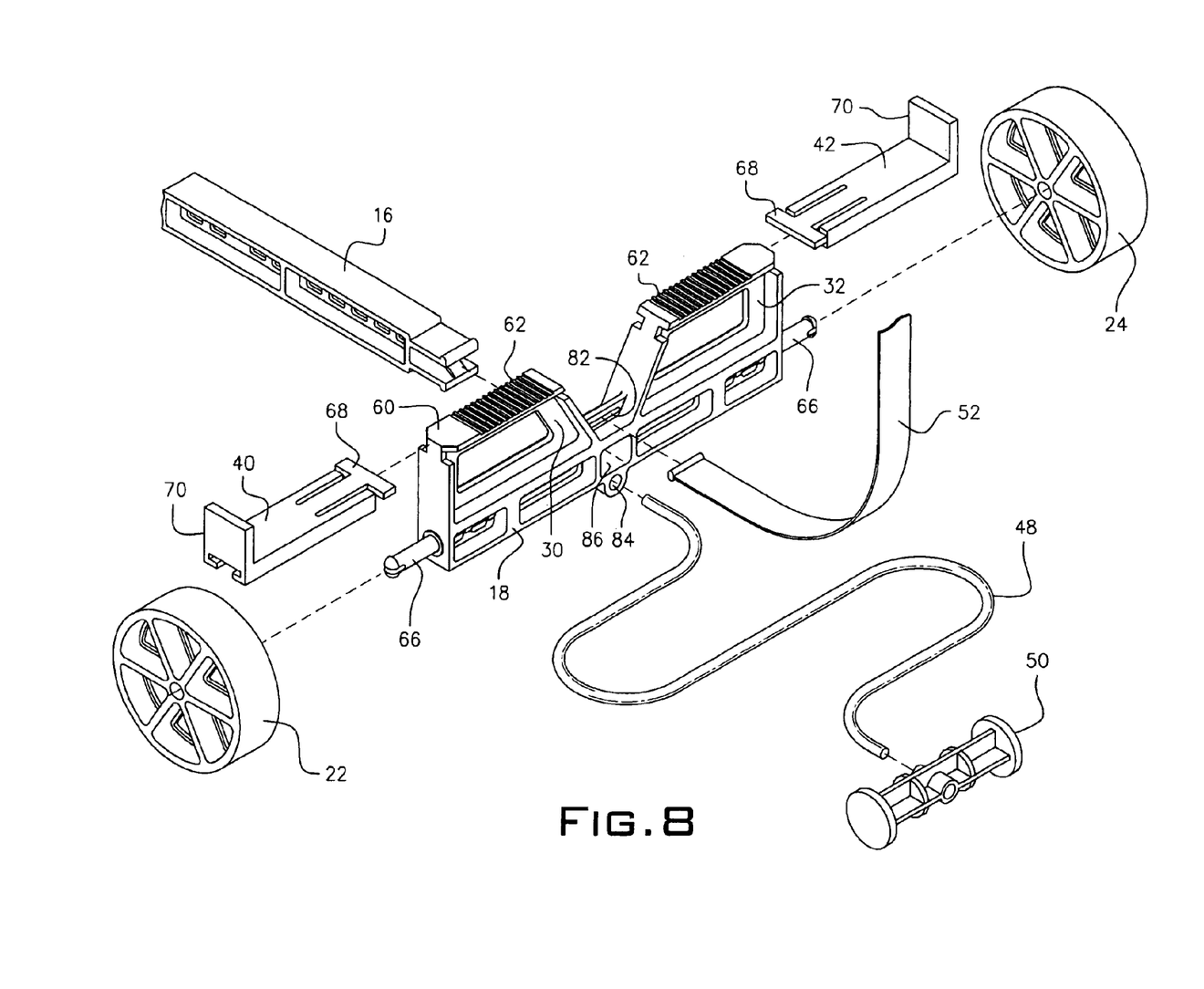
FIG. 8 is an exploded view of the front portion of the adjustable container carriage.

The mechanism for widening or narrowing the platform for receipt of the container 38 is shown in FIGS. 3 and 7. The upright frame 32 is integral with a top surface of axle housing 18. A top surface 60 of frame 32 has multiple ridges 62 perpendicular to the axle housing 18. In addition, the top surface 60 has side edges 64 which slide in C-channels 65 on each side of a planar platform 42 so that platform 42 can move inwardly or outwardly. The platform 42 has a latch 68 with a bottom surface having a spike 63 corresponding to and engaging between ridges 62. By lifting latch 68, the ridges 62 and spike 63 disengage so platform 42 can move inwardly or outwardly to accommodate the width of container 38. Upright walls 70 integral with platforms 40, 42, 44 and 46 act as a stop to prevent a container from moving sideways off the carriage 10.

Figure 4:
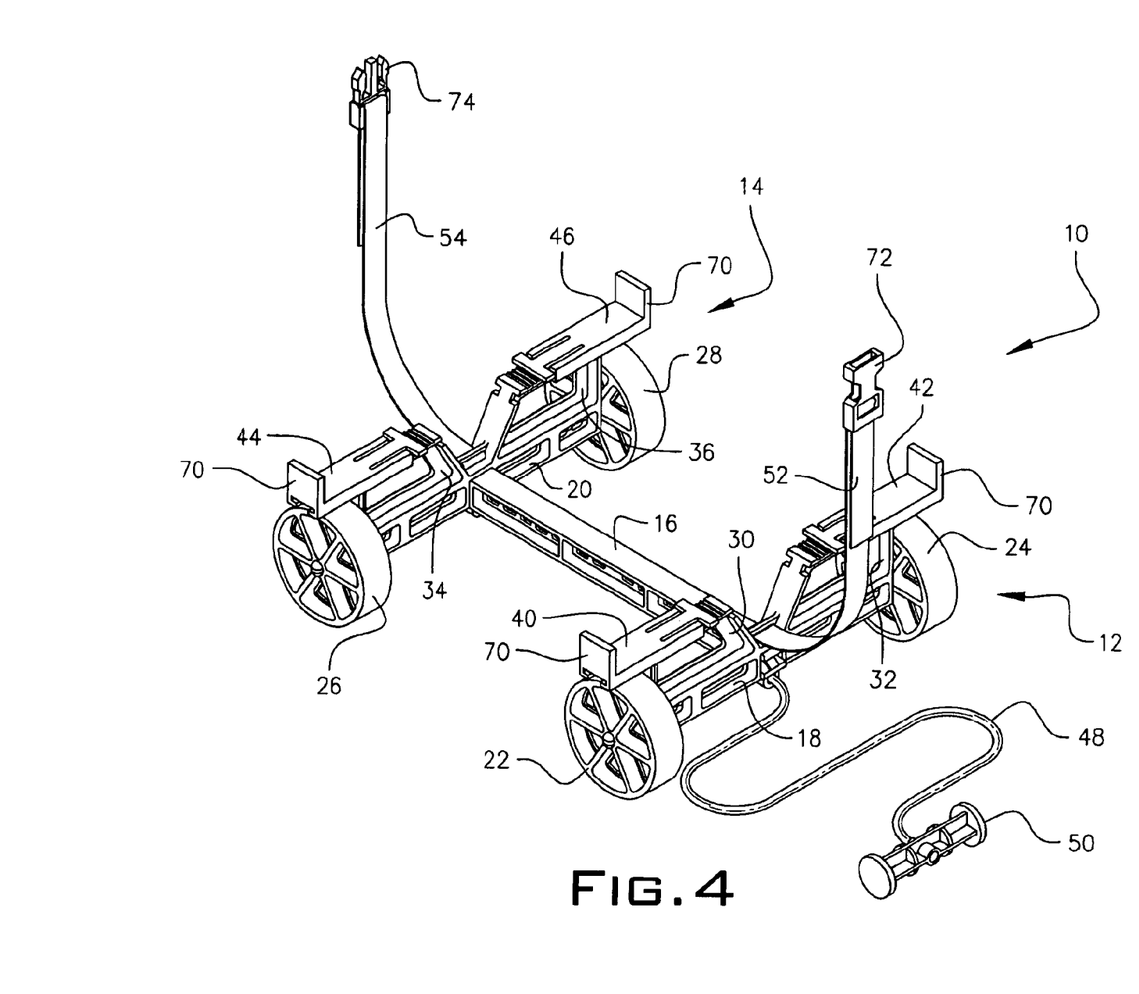
FIG. 4 is a perspective view of the adjustable container carriage with alternate tie down straps.
Figure 5:
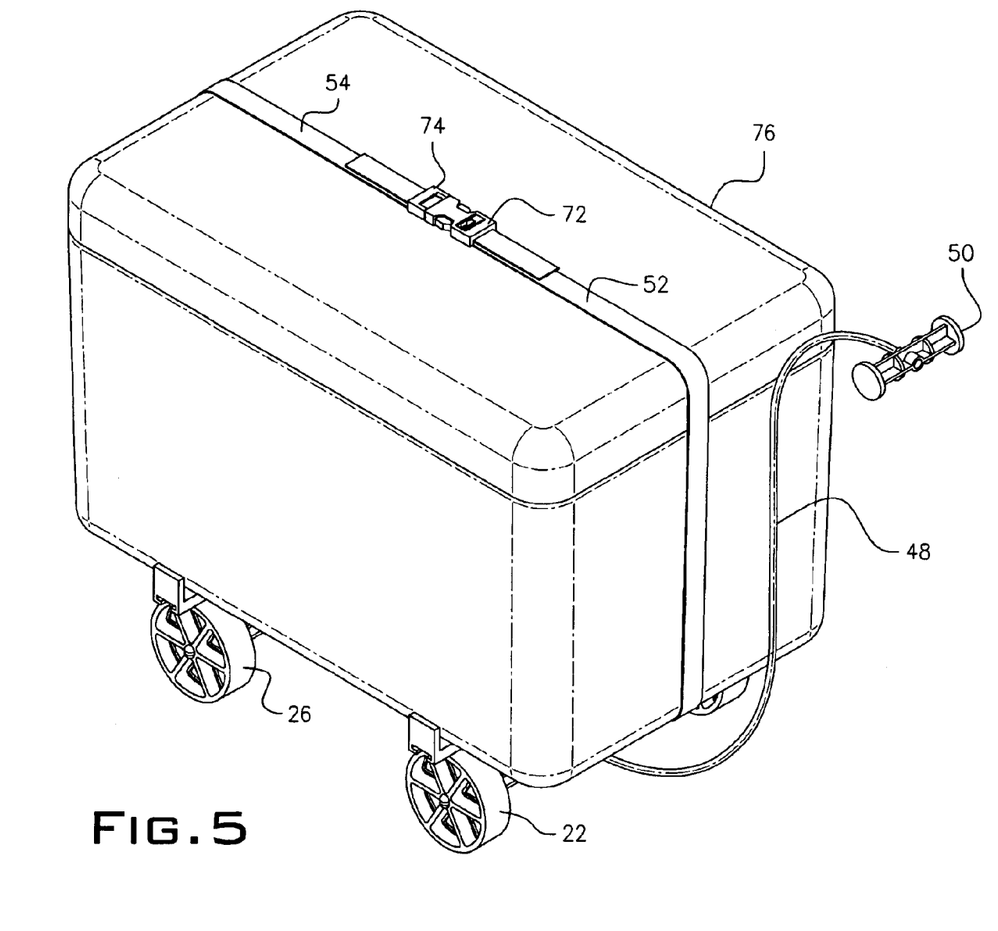
FIG. 5 is a perspective view of the carriage of FIG. 4 supporting a closed container.

As shown in FIGS. 4 and 5, alternate means for connecting straps 52 and 54 can be used. Female connector 72 accepts male connector 74 to fixedly attach the ends of straps 52 and 54. Other connectors can be employed in like manner. Containers can assume many shapes and can be open as shown in FIG. 2 for container 38 or closed as shown in FIG. 5 for container 76.

Figure 6:
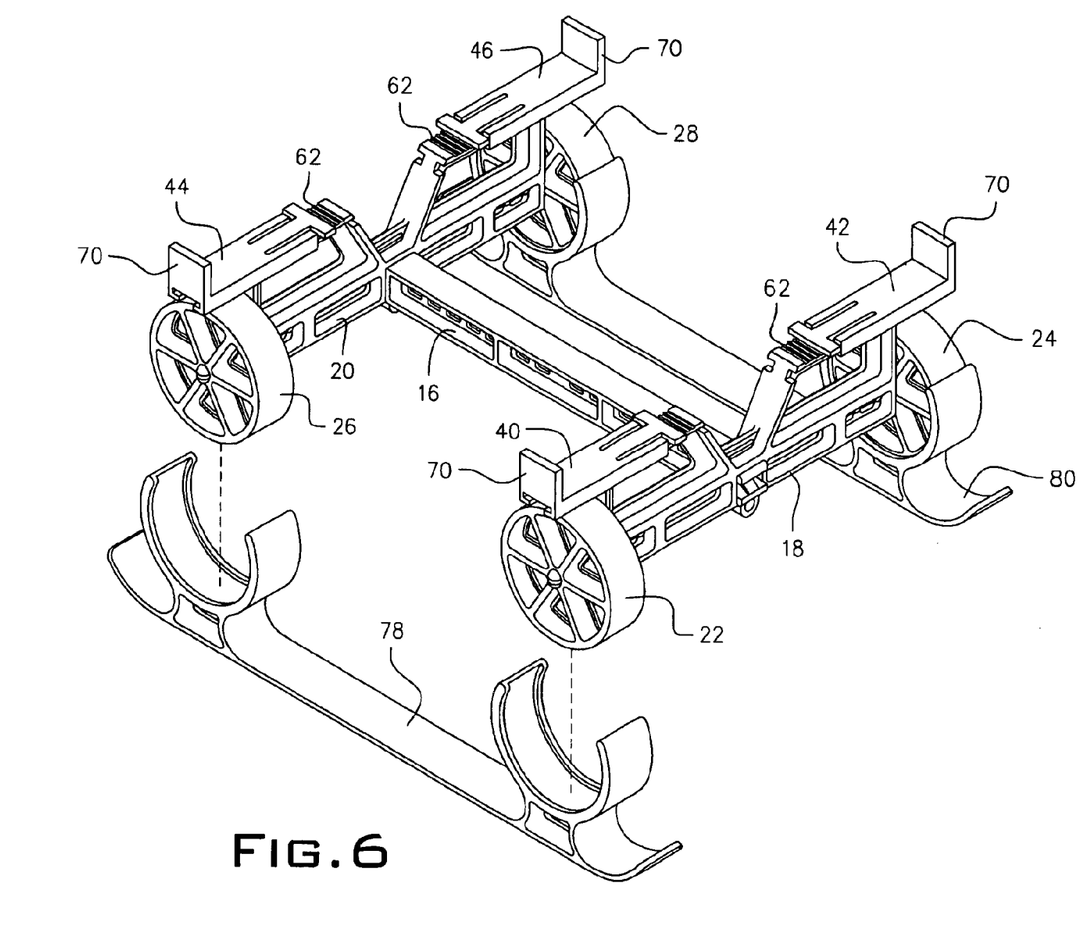
FIG. 6 is an exploded view of the carriage with a snow ski conversion assembly.

Right ski 78 or left ski 80 can be attached to wheels 22/26 and 24/28, respectively to use carriage 10 in snow or on ice.

The front wheel assembly 12, the rear wheel assembly 14, the central connecting member 16, the wheels 22, 24, 26 and 28, and the movable planar platforms 40, 42, 44 and 46 are all disengageable for compact storage. They are made of a high strength polymer.

Equivalent elements can be substituted for the elements of carriage 10 to provide substantially the same result, in substantially the way to achieve substantially the same function.

What is claimed is:

1. An adjustable width carriage for supporting and carrying containers of varying widths, the carriage comprising:
   a front and rear wheel assembly connected by a central connecting member;
   the front and rear wheel assemblies each having an axle housing having a shaft at a first and second end with a wheel rotating on the shaft at the first and second end;

a right side upright support frame affixed to a top surface of the axle housing between the central connecting member and the first end of the axle housing and a left side upright support frame affixed to the axle housing between the central connecting member and the second end of the axle housing in the front and rear wheel assemblies;

the upright support frames each having on a top surface multiple engagement ridges, the top surface terminating in side edges adapted to engage oppositely positioned C-channels on a movable planar platform;

the movable planar platform having a top and bottom surface, the platform slidably mounted along the side edges of the support frame; and a latch portion of the platform having a bottom surface with an engagement spike complimentary to the engagement ridges on the top surface of the upright support frame so that upon lifting of the latch the spike disengages from the engagement ridges and movement of the planar platforms can be achieved by sliding the planar platforms in or out with respect to the central connecting member to accommodate containers of different widths resting on a top surface of the planar platform.

2. An adjustable width carriage according to claim 1 wherein the central connecting member has a front portion snapping into an opening in the front axle housing and a rear portion snapping into an opening in the rear axle housing.

3. An adjustable width carriage according to claim 1 wherein a rope is attached through a bore in the front wheel assembly for pulling the carriage.

4. An adjustable width carriage according to claim 1 wherein an open container is mounted on the planar platforms.

5. An adjustable width carriage according to claim 4 wherein the open container is held in place by a pair of U-clamps, each affixed to a strap, the strap attached distally from the U-clamp to the wheel assembly.

6. An adjustable width carriage according to claim 4 wherein the planar platforms have an upright wall at an outboard end to prevent sideways movement of the container.

7. An adjustable width carriage according to claim 1 wherein a closed container is mounted on the planar platforms.

8. An adjustable width carriage according to claim 7 wherein the closed container is held in place by a pair of straps, each attached at a bottom end to the front and rear wheel assemblies, respectively and engaged together at a top end by a male and female snap lock fastener.

9. A four wheeled carriage for supporting and carrying containers of varying widths, the carriage comprising:

a front and rear wheel assembly, each having an axle housing with a wheel rotating on a shaft at a first and second end of the axle housing;

a connecting member attached to a central portion of the front and rear wheel assemblies;

a right side upright support frame affixed to a top surface of the axle housing between the central connecting member and the first end of the axle housing and a left side upright support frame affixed to the axle housing between the connecting member and the second end of the axle housing on the front and rear wheel assemblies;

the upright support frames each having on a top surface multiple engagement ridges positioned to receive a spike on a bottom surface of a latch, the top surface terminating in side edges;

a movable planar platform having a top surface with the latch formed at an inboard end of the platform, C-channels formed on opposed inner sides of the planar platform to receive the side edges of the upright support frame top surface; and the spike on the bottom surface of the latch portion of the platform normally contacting the engagement ridges on the top surface of the upright support frame, but upon lifting of the latch the spike is disengaged from the ridges and movement of the planar platform can be achieved by sliding the planar platform in or out with respect to the connecting member to accommodate containers of different width resting on a top surface of the planar platform.

10. A four wheeled carriage according to claim 9 wherein the front portion of the connecting member snaps into a through bore in the front axle housing and the rear portion of the connecting member snaps into a through bore in the rear axle housing.

11. A four wheeled carriage according to claim 9 wherein the right side upright support frame and left side upright support frame are integral with the respective axle housings.

12. A four wheeled carriage according to claim 9 wherein the front and rear wheel assemblies, the connecting member, the wheels and the movable planar platform are disengageable for storage.

13. A four wheeled carriage according to claim 9 wherein a pulling rope is attached to the front wheel assembly at a bottom end and to a handle at a top end.

14. A four wheeled carriage according to claim 9 wherein a first and second container support strap is attached to the front and rear wheel assemblies, respectively at a bottom end and to a clamp at a top end.

15. An adjustable width carriage for supporting and carrying containers of varying widths, the carriage comprising:

a front and rear wheel assembly connected by a removable connecting member;

the front and rear wheel assemblies each having an axle housing with a shaft at a first and second end and a wheel rotating on the shaft at the first and second end;

a right and left side upright support frame integral with a top of the axle housing on both the front and rear wheel assemblies;

the upright support frames each having a top surface containing engagement ridges and a side surface on each side of the top surface adapted to receive a C-channel on opposite inner edges of a movable planar platform;

the movable planar platform having a top surface formed with a movable latch, the latch having a bottom projection adapted to engage the engagement ridges on the upright support frame in a resting position, but upon lifting the latch the planar platform is capable of moving inwardly or outwardly with respect to the upright support frame.

16. An adjustable width carriage according to claim 15 wherein a pair of skis is attached to the right side and left side front and rear wheels, respectively to permit movement of the carriage on snow or ice.

* * * * *